May 20, 1924.  
J. W. WILSON  
1,495,128
COMBINED GEAR SHIFT AND BRAKE
Filed April 20, 1923   3 Sheets-Sheet 1
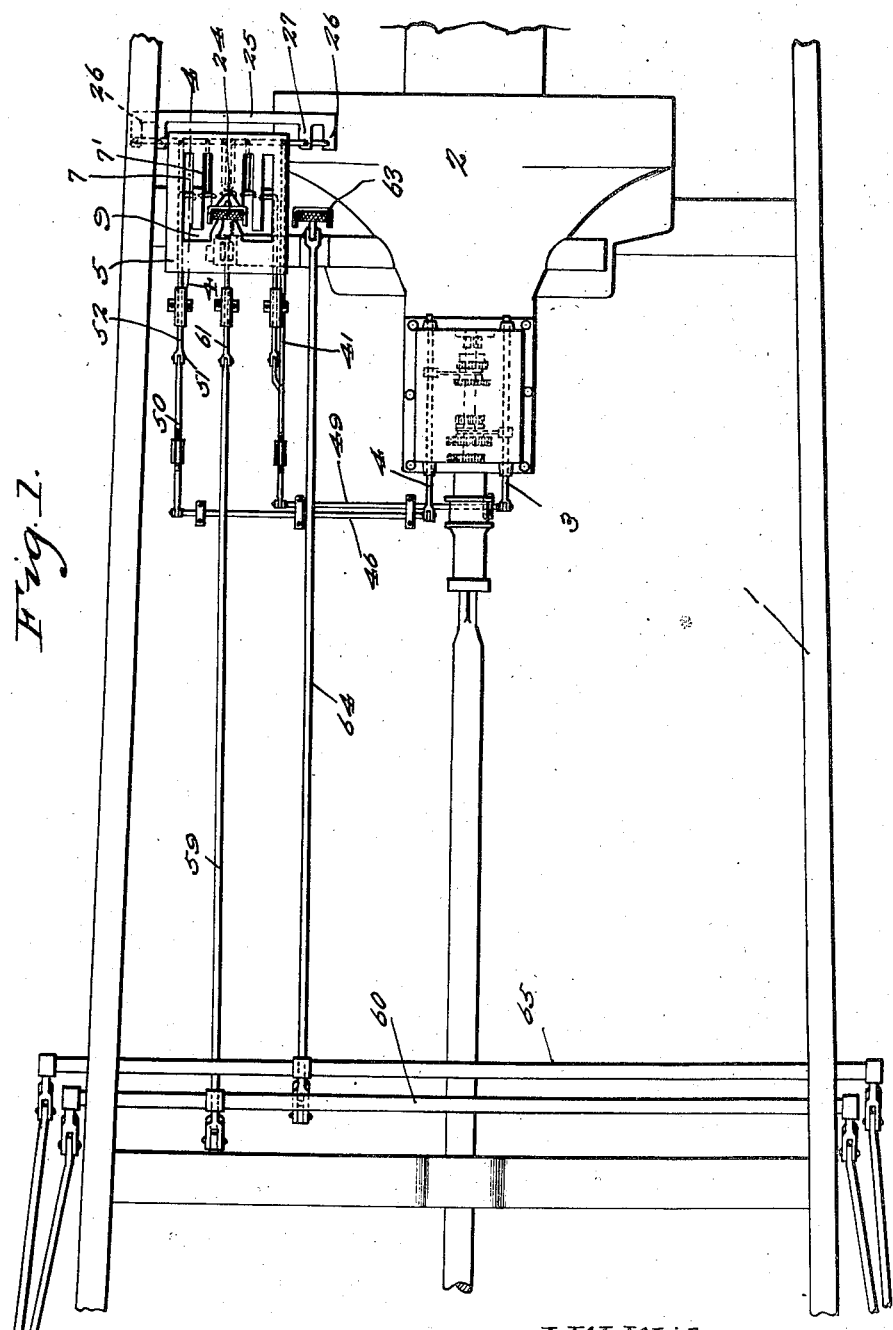

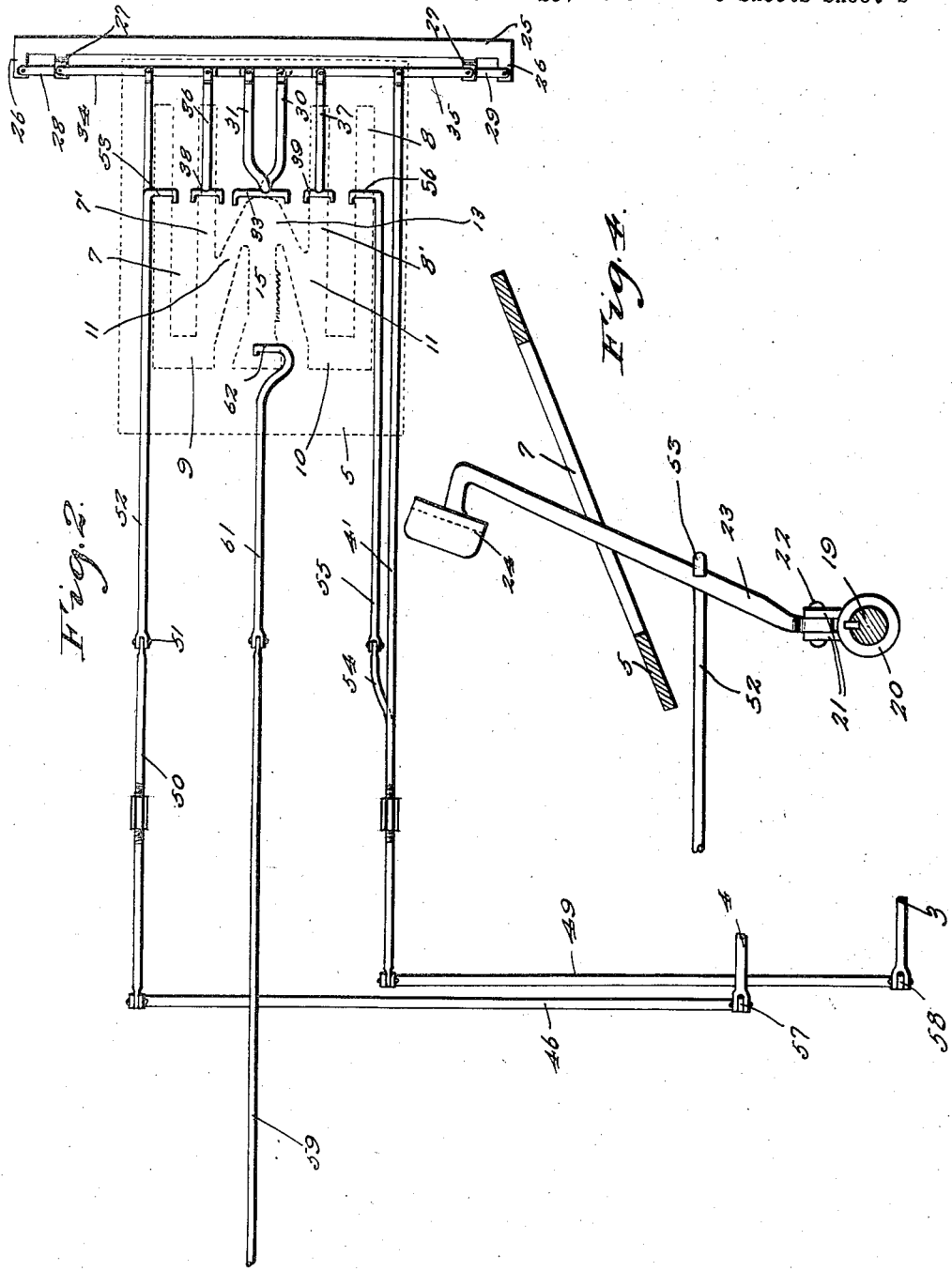

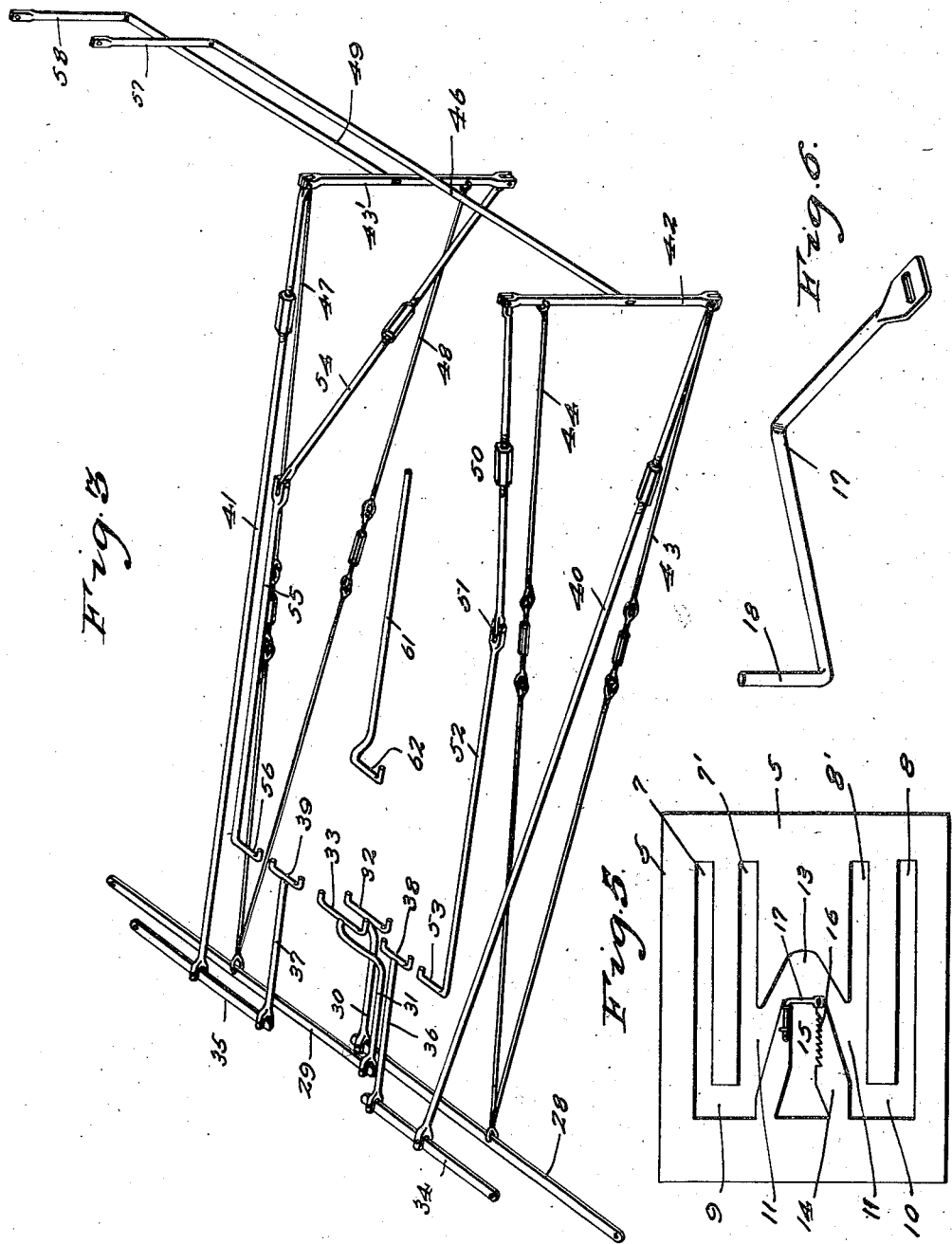

Patented May 20, 1924.

1,495,128

UNITED STATES PATENT OFFICE.

JAMES WALLACE WILSON, OF FARMDALE, KENTUCKY.

COMBINED GEAR SHIFT AND BRAKE.

Application filed April 20, 1923. Serial No. 633,534.

*To all whom it may concern:*

Be it known that I, JAMES WALLACE WILSON, a citizen of the United States, residing at Farmdale, in the county of Franklin and State of Kentucky, have invented new and useful Improvements in Combined Gear Shifts and Brakes, of which the following is a specification.

My present invention has reference to a control system for automobiles.

An object is to dispense with the ordinary gear shift lever and the emergency brake lever, and to substitute in lieu thereof a foot pedal mounted on the clutch shaft for lateral swinging movement, and longitudinally movable through slots in a shifting gate or plate for contacting engagement with elements arranged below the slots for shifting the gears when contacted by the pedal so that the said pedal is successfully employed for releasing the clutch and for shifting the gears, and wherein the pedal is likewise movable through an intermediate slot in the said plate to engage means therebelow for applying the emergency brake, and furthermore whereby the said pedal may be locked in its last mentioned position so that the automobile cannot be run under its own power until such means are released.

To the attainment of the foregoing, and other objects which will present themselves as the nature of the invention is better understood, reference is to be had to the accompanying drawings in which there is illustrated a satisfactory embodiment of the improvement reduced to practice, and wherein:—

Figure 1 is a plan view of a sufficient portion of an automobile frame and power plant to illustrate the application of the improvement.

Figure 2 is a similar view, on an enlarged scale, to more clearly illustrate the construction, the slotted gate and the clutch releasing and gear shift pedal being removed.

Figure 3 is a perspective view of the mechanism employed, the clutch release and gear shift pedal being omitted.

Figure 4 is an enlarged sectional view approximately on the line 4—4 of Figure 1.

Figure 5 is an enlarged top plan view of the slotted gate.

Figure 6 is a perspective view of the latch for the intermediate slot in the gate whereby the pedal may be locked in such slot to prevent the surreptitious driving of the automobile.

As disclosed by the drawings, I dispense with the gear shift lever and with the emergency brake pedal that are commonly employed on the power plants of all gear shift automobiles, with the result that much more room is left between the dash and front seat of a machine and it will be further apparent, as the nature and operation of the improvement are fully described, that I have provided an extremely simple mechanism, operated by a single foot lever for both releasing the clutch and operating the gear shift in a better and more expeditious manner than has heretofore been accomplished.

In the drawings, the frame of an automobile is indicated by the numeral 1. The frame supports thereon, in the usual manner, the power plant 2, the said plant having associated with its drive shaft the usual fixed and slidable gears shifted into or out of mesh by the gear shift rods 3 and 4 to obtain the desired speed changes. The speed changing gears are well-known in the art, have been diagrammatically shown by the dotted lines in Figure 1 of the drawings, and will not herein be entered into in detail.

On the left hand side of the dash at the front of the automobile I secure a slotted plate 5, having slots therein which are commonly known as the shifting gate. The plate, adjacent its ends is provided with a pair of longitudinal slots 7, 7', 8 and 8'. These slots, adjacent the inner edge of the plate 6 are provided with communicating passages 9 and 10 respectively. The slots 7' and 8' are of a less length than the outer slots 7 and 8, there being inward angular passages 11 and 12 between the passages 9 and 10 that communicate with the said slots and provide the center of the plate with a substantially V-shaped opening 13 and with a substantially V-shaped lug that partly projects in the opening which is indicated by the numeral 14. The lug 14 is provided with a central slot 15 which is widened at the inner end thereof. One of the edges provided by the slot 15 is toothed, as at 16, and the entrance to the slot 15 may be closed by a swingable latch member 17, illustrated in detail in Figure 6. The latch member is preferably constructed from a metal rod, the body portion of which being hingedly secured to the lug 14 in a line with the slot 15 opposite the wall thereof formed with the teeth 16. The inner end of the latch is offset angularly, as at 18 and the opposite end is likewise arranged at a right angle at a different direction and at a different plane from the end 18. This last mentioned portion is designed to straddle the slot or passage 15, and has its end flattened and slotted to receive therethrough a hasp secured on the toothed sides of the lug 14. Through this hasp there may be passed suitable locking means for closing the passage 15. The angle end 18 serves as a stop for the latch when the latter is swung to open position.

The clutch release rod is indicated by the numeral 19. This rod has, in the present instance, keyed thereon a sleeve 20. The sleeve has upwardly projecting spaced ears 21 between which is pivoted, as at 22, the inner end of an arm 23. The outer end of the arm 23 is angular and has formed therewith or secured thereon a foot pedal 24. The arm 23 is designed for movement through any of the gate passages or slots in the plate 6. A lateral swinging of the pedal will not influence the clutch release shaft 19, but a movement of the pedal longitudinally through any of the gate slots will turn the rod 19 to release the clutch.

Between the power plant 2 and one of the longitudinal members of the frame 1, forward of the plate 5 I secure a bar 25. The bar 25 has end lugs 26 and inner lugs 27 disposed above the plane of the lugs 26. To the respective end lugs 26 I pivot the ends of levers 28 and 29 respectively, the said levers being directed toward each other but being disposed one slightly below the plane of the other. To the inner ends of these levers 28 and 29 I pivot rods 30 and 31 respectively. The rod 31 has its free end offset to direct the same above the end of the rod 30, and both of the said rods have their ends provided with substantially U-shaped or stirrup members 32 and 33 respectively. To the lugs 27 I pivotally secure short levers 34 and 35 respectively. These levers are directed toward but terminating a suitable distance away from each other. Pivotally secured to the inner ends of the levers 34 and 35 there are rods 36 and 37 respectively which have outer laterally extending stirrups 38 and 39 respectively. Centrally pivoted to the levers 34 and 35 there are long rods 40 and 41 respectively. The rod 40 is downwardly inclined with respect to the plane of the rod 41. The rod 40 is pivotally connected to the lower end of a rocker arm 42, and the rod 41 is pivotally secured to the upper end of a second rocker arm 43'. Approximately centrally connected to the levers 28 and 29 there are eyes and to which are secured cables. The cable connected to the lever 28 has its upper strand 44 secured to the rocker arm 42, the lower strand 43 of the said cable being likewise secured to the said rocker arm. The strands 43 and 44 are secured to the rocker arm 42 at points equi-distant from a shaft 46 on which the rocker arm is secured. In a like manner the upper and lower strands 47 and 48 of the cable connected with the lever 29 are secured to a rocker arm 43' at points equi-distant from the connection of a shaft 49 with the said rocker arm.

Pivotally secured to the upper end of the rocker arm 42 there is a link 50, and to this link there is pivoted, as at 51 a rod 52 directed toward the stirrups. The rod 52 has an angle end arranged in a plane with the stirrup 38 and likewise providing a stirrup 53.

Pivotally secured to the lower end and projecting rearwardly at an upward angle from the rocker arm 43' there is a link 54. To the end of this link there is pivoted a rod 55 directed toward the lever 29, and terminating in an angle stirrup 56 which is arranged in a plane with the stirrup 39.

The shafts 46 and 49 have their ends arranged at an upward angle as indicated by the numerals 57 and 58 respectively, and these ends of the shafts are respectively connected to the gear shift rods 3 and 4.

The numeral 59 designates a rod pivoted to a link secured on a rocker shaft 60 that has cranked ends to which are pivoted rods connected to the emergency brakes for the vehicle. The rod 59 is pivotally secured to a rod extension 61 directed toward the stirrups 32 and 33 and having its free end offset to provide a stirrup 62.

The foot brake pedal is indicated in Figure 1 of the drawings by the numeral 63, and is connected in the usual manner with a rod 64 secured to an angle arm on a rocker shaft 65 whose outer ends are cranked and to the cranked ends there are pivoted rods for operating the foot brake mechanism.

The stirrup 53 of the rod 52 is arranged directly beneath the slot 8 in the plate 5. The stirrup 38 for the rod 36 is arranged directly beneath the slot 8' in the said plate 5. The stirrups 32 and 33 are arranged below the central portion of the plate forward of the slotted lug 14. The stirrup 39 of the rod 32 is arranged beneath the slot 7' of the plate 5, while the stirrup 56 of the rod 55 is arranged below the slot 7 of the said plate and the stirrup 62 of the emergency brake rod 61 is arranged directly below the slot 15 on the central extension 14 of the plate 6.

The neutral position of the pedal 24 is in the substantially V-shaped slots provided between the passages 11, 12 and 13. The pedal arm 23 by its particular and peculiar connection with the clutch release shaft 19 may be swung laterally without influencing the shaft. Suppose that we desire to start the car and therefore shift the gears to low speed. The clutch is swung through the angle slot 11 in the plate 5 and through the passage 9 in a line with the slot 7. A pressure upon the pedal to move the same longitudinally through the slot 11 will turn the shaft 19 to release the clutch and also cause the pedal to contact with the stirrup 56 which, through the medium of its link connection with the rocker arm 43' will swing the same to turn the shaft 49 to cause the angle end 58 thereof to move the gear shift rod 3 to shift the gears to low speed engagement. The gear shift rod 3 is held in such position by the usual spring influenced rounded detent. The swinging of the rocker arm 43 imparts a swinging movement to the lever 35 in a reverse direction to the movement of the stirrup 56 to move the stirrup 39 beneath the slot 7' toward the passage 11, such swinging of the rocker arm 43 likewise drawing on the cable to cause the strand 47 to slacken and to pull upon the strand 48 thereof to swing the lever 29 to bring the stirrup 33 from beneath the plate 5 into the opening or passage 13. To change to a second speed it is desirable that the pedal be brought out of the slot 7 through the passages 9 and 11 to contact with the stirrup 33, the forward movement of the pedal influencing the stirrup to return the parts to initial position, that is to neutral position. It is, of course, obvious that a direct passage of the pedal arm may be made between the slots 7 and 7' to cause the pedal arm to act on the stirrup 39 to rock the arm 43' in a reverse direction to that described. By bringing the pedal arm into the slots 8 or 8' to act on the stirrups 53 or 38 a similar swinging movement is imparted in opposite directions to the rocker arm 43' in accordance with which stirrup the pedal arm contacts and the cable connected to the rocker arm 42 and lever 28 will swing the latter to project the stirrup 33 into the neutral passage 13 in the plate 5, and a swinging movement of the pedal against the stirrup 32 will bring the parts to neutral position.

By opening the latch 17 the pedal arm can be moved into the slot 15 and brought to engage the hook-shaped stirrup 62 of the emergency brake rod 61, a forward movement of the pedal arm will draw the rod 61 to apply the brakes. The application of the brakes may be regulated by arranging the pedal arm 23 in the different notches 16, and as previously stated, the pedal may be locked in the slot 15 by locking the latch 17 so that unauthorized use of the car will be prevented.

A gear shift as above described is of a comparatively simple structure and is positive in action. As previously stated, much more room is acquired at the front of the automobile when my improvement is attached thereto, and while it is thought that the foregoing description, when taken in connection with the drawings will fully set forth the construction and advantages of the invention to those skilled in the art to which the same appertains, it is to be understood that I do not desire to be restricted to the precise structural details herein set forth, but hold myself entitled to all such changes therefrom as fall within the scope of what I claim.

Having described the invention, I claim:—

1. In a control system for automobiles, the combination, a plate slotted transversely and longitudinally, a foot pedal passing therethrough, a sleeve secured to the clutch release shaft of the automobile and having fixed ears between which the pedal is pivoted to permit of a lateral swinging movement of the pedal without influencing the clutch release shaft and to also cause the turning of the shaft when an outward pressure is exerted on the pedal to bring the same into any of the longitudinal slots of the plate, shafts having angle ends respectively pivotally connected to the gear shift rods of the automobile, rocker arms secured to the free ends of the last mentioned shafts, means connected with the rocker arms, elements connected with said means, stirrups pivotally secured to said elements and disposed below the longitudinal slots in the plate in the path of contact with the pedal when the same is swung into any of said longitudinal slots, as and for the purpose set forth.

2. In a control system for automobiles, the combination, a plate having lateral and longitudinal slots, a pedal passing therethrough, means connecting the pedal to the clutch release shaft of the automobile to permit of a lateral movement of the pedal without influencing the shaft, but to cause the turning of the shaft and the release of the clutch, when the pedal is swung into any of the longitudinal slots, shafts each having an angle end pivotally associated with the respective gear shift rods of the automobiles, rocker arms connected beyond the centers thereof with the respective shafts, pivotally supported levers, a pair of angularly disposed rods secured an equidistance from the shafts on the respective rocker arms and connected to one pair of said levers, an angularly arranged rod also pivoted to each of the rocker arms an equidistance from its connection with its shaft and pivotally secured to the second mentioned levers, links pivotally secured to the extreme outer ends of the respective rocker arms, a rod pivotally secured to each of said links having stirrup ends, and stirrup members pivotally secured to the inner and confronting ends of the mentioned levers, and all of said stirrups being in the path of contact with the pedal when the latter is swung into any of the longitudinal slots in the plate, as and for the purpose set forth.

3. In a control system for automobiles, the combination, a plate having lateral and longitudinal slots, a pedal passing therethrough, means connecting the pedal to the clutch release shaft of the automobile to permit of a lateral movement of the pedal without influencing the shaft, but to cause the turning of the shaft and the release of the clutch, when the pedal is swung into any of the longitudinal slots, shafts each having an angle end pivotally associated with the respective gear shift rods of the automobiles, rocker arms connected beyond the centers thereof with the respective shafts, pivotally supported levers, a pair of angularly disposed rods secured an equidistance from the shafts on the respective rocker arms and connected to one pair of said levers, an angularly arranged rod also pivoted to each of the rocker arms an equidistance from its connection with its shaft and pivotally secured to the second mentioned levers, links pivotally secured to the extreme outer ends of the respective rocker arms, a rod pivotally secured to each of said links having stirrup ends, and stirrup members pivotally secured to the inner and confronting ends of the mentioned levers, all of said stirrups being in the path of contact with the pedal when the latter is swung into any of the longitudinal slots in the plate, a rod connected to the rocker shaft of the emergency brake for the automobile having a stirrup end disposed below the central longitudinal slot in the plate and designed for contact with the pedal when the latter is moved in said slot, means latching the pedal in said slot for regulating the pressure on the last mentioned stirrup, and means for locking the pedal in said slot, as and for the purpose set forth.

In testimony whereof I affix my signature.

JAMES WALLACE WILSON.